(12) United States Patent
Imoto et al.

(10) Patent No.: US 10,560,199 B2
(45) Date of Patent: Feb. 11, 2020

(54) SIGNAL PROCESSING CIRCUIT AND OPTICAL RECEIVING DEVICE

(71) Applicant: FUJITSU LIMITED, Kawasaki-shi, Kanagawa (JP)

(72) Inventors: Yuya Imoto, Kawasaki (JP); Kazuhiko Hatae, Kawasaki (JP); Nobukazu Koizumi, Kawasaki (JP); Yasuo Ohtomo, Yokohama (JP); Masato Oota, Atsugi (JP); Masashi Sato, Kawasaki (JP); Daisuke Sasaki, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/255,963

(22) Filed: Jan. 24, 2019

(65) Prior Publication Data

US 2019/0280779 A1 Sep. 12, 2019

(30) Foreign Application Priority Data

Mar. 9, 2018 (JP) ................................ 2018-043506

(51) Int. Cl.
| | |
|---|---|
| *H04B 10/61* | (2013.01) |
| *H04L 25/03* | (2006.01) |
| *H04B 10/69* | (2013.01) |
| *H04B 10/2569* | (2013.01) |
| *H04L 5/06* | (2006.01) |
| *H04L 27/26* | (2006.01) |

(52) U.S. Cl.
CPC ..... *H04B 10/6165* (2013.01); *H04B 10/6162* (2013.01); *H04B 10/6971* (2013.01);
(Continued)

(58) Field of Classification Search
CPC ............ H04B 10/6165; H04B 10/6162; H04B 10/6971; H04L 25/03019; H04L 2025/03471
(Continued)

(56) References Cited

U.S. PATENT DOCUMENTS 5,793,818 A * 8/1998 Claydon ............... H04L 1/0054
375/326
6,094,464 A * 7/2000 Ebringer ................. H04L 7/041
375/342
(Continued)

FOREIGN PATENT DOCUMENTS

JP     2012-119923     6/2012

*Primary Examiner* — Abbas H Alagheband
(74) *Attorney, Agent, or Firm* — Fujitsu Patent Center

(57) ABSTRACT

A signal processing circuit includes: a processor configured to adjust phases of reception samples which is supplied at a supply interval, according to a phase adjustment amount; and a processing circuit including a finite impulse response (FIR) filter with taps and configured to process, by the FIR filter, each of the reception samples and output output symbols at an output interval different from the supply interval, the processor is configured to: derive initial values of tap coefficients for the respective taps; and derive the phase adjustment amount such that a center of centroids of the tap coefficients at respective output time points of the output symbols coincides with a center of a number of taps of the FIR filter, the tap coefficients at respective output time points of the output symbols being set according to a deviation between the supply interval and the output interval and the initial values.

8 Claims, 11 Drawing Sheets

(52) U.S. Cl.
CPC .... H04L 25/03019 (2013.01); *H04B 10/2569* (2013.01); *H04L 5/06* (2013.01); *H04L 27/2626* (2013.01); *H04L 2025/03471* (2013.01)

(58) Field of Classification Search
USPC ......................................................... 398/208
See application file for complete search history.

(56) References Cited

U.S. PATENT DOCUMENTS

| | | | | |
|---|---|---|---|---|
| 6,175,591 B1* | 1/2001 | Iwamatsu | ............ | H03H 17/06 375/232 |
| 6,563,859 B1* | 5/2003 | Oishi | ................... | H04B 1/7115 375/148 |
| 7,561,629 B2* | 7/2009 | Miyatani | ................... | H04L 5/06 330/149 |
| 8,705,977 B1* | 4/2014 | Mo | .................... | H04B 10/2569 398/152 |
| 8,744,279 B2* | 6/2014 | Mo | .................... | H04B 10/2569 398/136 |
| 9,768,914 B2* | 9/2017 | Levy | ....................... | H04B 10/60 |
| 2009/0207955 A1* | 8/2009 | Hoshuyama | ....... | H03H 21/0012 375/346 |
| 2011/0064421 A1* | 3/2011 | Zhang | ................ | H04B 10/6161 398/208 |
| 2012/0134684 A1* | 5/2012 | Koizumi | ................ | H04B 10/613 398/202 |
| 2012/0269513 A1* | 10/2012 | Abe | ..................... | H04B 10/532 398/65 |
| 2014/0029959 A1* | 1/2014 | Koizumi | ................... | H03J 7/26 398/208 |

\* cited by examiner

FRACTIONAL SAMPLING RATE 1.5

PHASE 0

PHASE 1

PHASE 0

PHASE 1

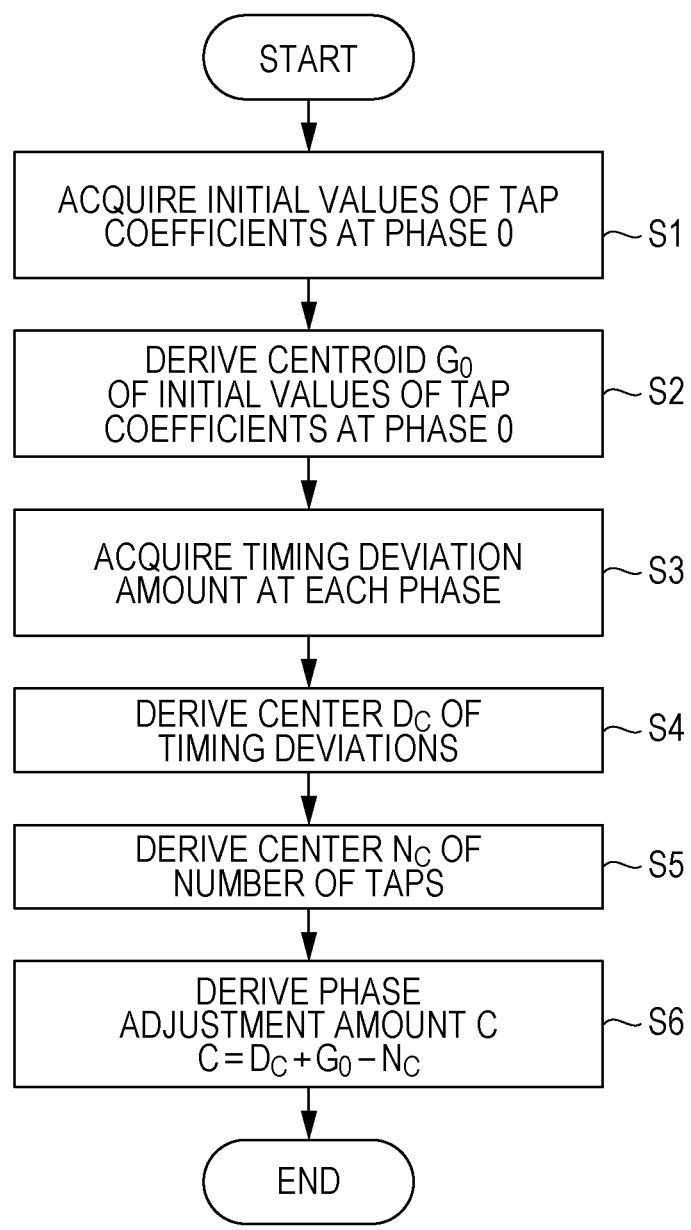

FRACTIONAL SAMPLING RATE 1.33

FRACTIONAL SAMPLING RATE 1.25

SIGNAL PROCESSING CIRCUIT AND OPTICAL RECEIVING DEVICE

CROSS-REFERENCE TO RELATED APPLICATION

This application is based upon and claims the benefit of priority of the prior Japanese Patent Application No. 2018-43506, filed on Mar. 9, 2018, the entire contents of which are incorporated herein by reference.

FIELD

The embodiments discussed herein are related to a signal processing circuit and an optical receiving device.

BACKGROUND

Digital coherent optical transmission is performed in an optical receiving device.

Related art is disclosed in Japanese Laid-open Patent Publication No. 2012-119923.

SUMMARY

According to an aspect of the embodiments, an apparatus includes a signal processing circuit includes: a processor configured to adjust phases of reception samples which is supplied at a supply interval, according to a phase adjustment amount; and a processing circuit including a finite impulse response (FIR) filter with a plurality of taps and configured to process, by the FIR filter, each of the reception samples whose phases is adjusted by the processor and output output symbols at an output interval different from the supply interval, the processor is further configured to: derive initial values of tap coefficients for the respective taps; and derive the phase adjustment amount such that a center of centroids of the tap coefficients at respective output time points of the output symbols coincides with a center of a number of taps of the FIR filter, the tap coefficients at respective output time points of the output symbols being set according to a deviation between the supply interval and the output interval and the initial values of the tap coefficients.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 11 is a flowchart illustrating an example of a flow of a process of deriving a phase adjustment amount, which is carried out in a phase adjustment amount deriving unit according to the embodiment of the disclosed technique;

DESCRIPTION OF EMBODIMENTS

Figure 1:
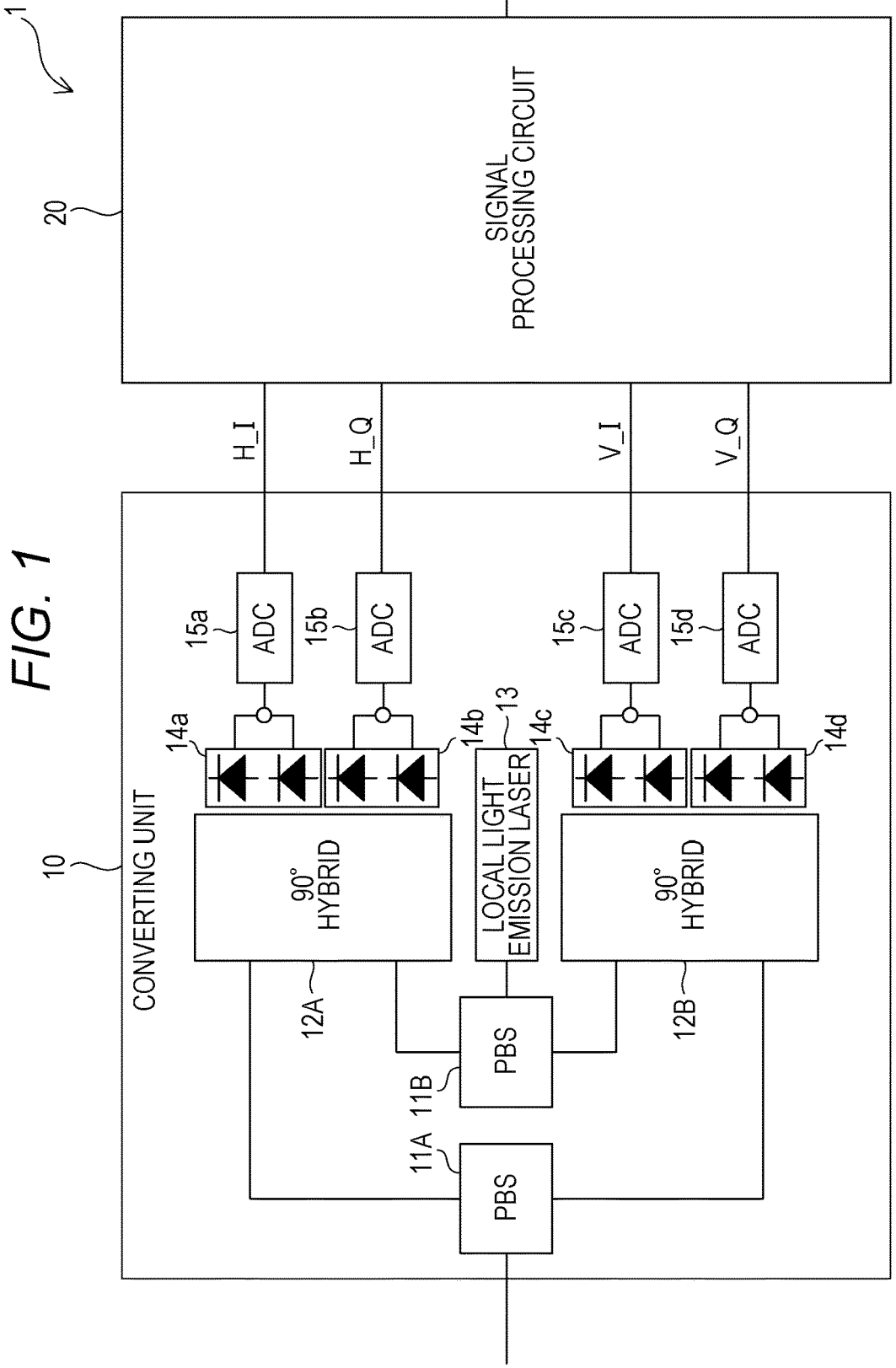
FIG. 1 is a diagram illustrating an example of a configuration of an optical receiving device according to an embodiment of the disclosed technique.

An adaptive equalizer includes a finite impulse response (FIR) filter with a predetermined number of taps, a register that holds a tap coefficient, a centroid calculation unit that calculates a centroid position of a filtering shape determined by the tap coefficient as a coefficient centroid position, and a tap coefficient shifting unit that shifts the tap coefficient in units of symbols. In an initial training stage before commencement of communication, the tap coefficient shifting unit has a tap coefficient adaptive control circuit that shifts the tap coefficient in units of symbols such that a difference between the calculated coefficient centroid position and a tap center determined by the number of taps of the FIR filter is minimized.

A digital coherent optical receiving device has a converting unit that converts received light with data superimposed on a phase of an optical carrier wave into an electrical signal and a signal processing circuit that compensates waveform distortion by processing the electrical signal. The signal processing circuit includes a finite impulse response (FIR) filter and compensates waveform distortion by setting a tap coefficient corresponding to the inverse characteristics of a transmission path in the FIR filter.

In the signal processing circuit, a fractional sampling method is applied from the viewpoint of achieving compatibility between waveform distortion compensation capability and low power consumption. In the fractional sampling method, the number of reception samples obtained by multiplying the number of transmission symbols transmitted from a transmitting device by a decimal greater than one (for example, 1.5) is supplied to the signal processing circuit. The signal processing circuit processes the reception samples by the FIR filter and outputs the same number of symbols as the number of transmission symbols. For example, the signal processing circuit outputs symbols at intervals different from the supply interval of the reception samples.

In the signal processing circuit, it is usually expected to shift the centroid position of the tap coefficients of the FIR filter at the timing when a deviation occurs between the supply timing of the reception sample and the output timing of the symbol. However, when the centroid position of the tap coefficients is shifted, the number of taps of the FIR filter may become insufficient and there is a possibility that a desired compensation capability is not properly obtained. In order to deal with this phenomenon, it is conceivable to increase the number of taps of the FIR filter, but in this case, the circuit scale is enlarged and the power consumption grows.

A desired compensation capability may be ensured in a signal processing circuit without increasing the number of taps of an FIR filter.

Hereinafter, embodiments of the present invention will be described with reference to the drawings. In the respective drawings, the same or equivalent constituent elements and parts are given the same reference numerals and redundant explanation will be omitted as appropriate.

FIG. 1 is a diagram illustrating an example of the configuration of an optical receiving device 1 according to an embodiment of the disclosed technique. The optical receiving device 1 is constituted by a converting unit 10 that converts an optical signal that has been received into an electrical signal and a signal processing circuit 20 that processes the electrical signal generated by the converting unit 10.

The converting unit 10 is provided with polarization beam splitters 11A and 11B, 90° hybrid optical mixers 12A and 12B, a local light emission laser 13, twin photodiodes 14a, 14b, 14c, and 14d, analog-to-digital (AD) converters 15a and 15b, 15c, and 15d.

The optical signal propagated through an optical fiber and received by the optical receiving device 1 is separated into H-axis polarized light and V-axis polarized light by the polarization beam splitter 11A and input to the 90° hybrid optical mixers 12A and 12B, respectively. The output of the local light emission laser 13 is input to each of the 90° hybrid optical mixers 12A and 12B via the polarization beam splitter 11B. In the 90° hybrid optical mixer 12A, the input H-axis polarized light is mixed with the local light emission and is separated into an I channel (in-phase) component and a Q channel (quadrature) component to be output. The output in-phase component and quadrature component are photoelectrically converted by the corresponding twin photodiodes 14a and 14b and converted into digital signals by the analog-to-digital (AD) converters 15a and 15b. Similarly, in the 90° hybrid optical mixer 12B, the V-axis polarized light is mixed with the local light emission and is separated into an I channel (in-phase) component and a Q channel (quadrature) component to be output. The output in-phase component and quadrature component are photoelectrically converted by the corresponding twin photodiodes 14c and 14d and converted into digital signals by the AD converters 15c and 15d. The signal component of the H-axis polarized light and the signal component of the V-axis polarized light, which have been digitally converted, are individually input to the signal processing circuit 20.

The AD converters 15a, 15b, 15c, and 15d perform sampling by the fractional sampling method. For example, the number of reception samples obtained by multiplying the number of transmission symbols transmitted from a transmitting device (not illustrated) by a decimal greater than one (for example, 1.5) is supplied to the signal processing circuit 20.

Figure 2:
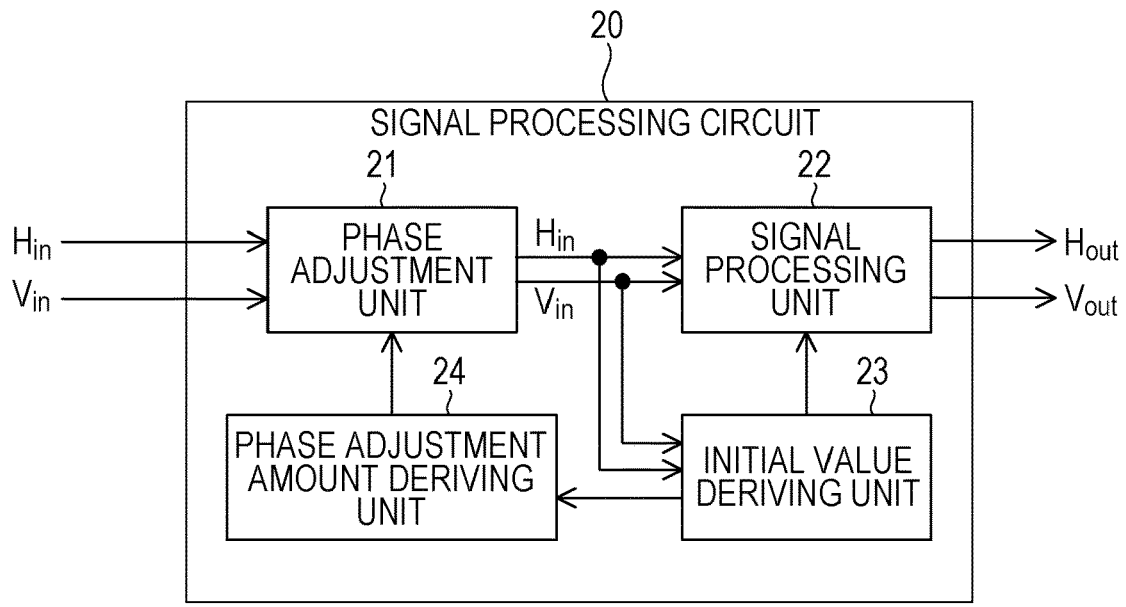
FIG. 2 is a diagram illustrating an example of a configuration of a signal processing circuit according to the embodiment of the disclosed technique.

FIG. 2 is a diagram illustrating an example of the configuration of the signal processing circuit 20 according to the embodiment of the disclosed technique. The signal processing circuit 20 is constituted by a phase adjustment unit 21, a signal processing unit 22, an initial value deriving unit 23, and a phase adjustment amount deriving unit 24. An H-axis polarized wave component $H_{in}$ including the in-phase component and the quadrature component in an H-axis direction and a V-axis polarized wave component $V_{in}$ including the in-phase component and the quadrature component in a V-axis direction are input to the phase adjustment unit 21, the signal processing unit 22, and the initial value deriving unit 23.

The phase adjustment unit 21 adjusts the phase of a reception sample sampled by the fractional sampling method, according to a phase adjustment amount derived by the phase adjustment amount deriving unit 24.

The signal processing unit 22 is provided with an FIR filter having a plurality of taps, which will be described later, and processes each of the reception samples whose phases have been adjusted by the phase adjustment unit 21 by the FIR filter, to output the same number of output symbols as the number of transmission symbols transmitted from the transmitting device (not illustrated). For example, the signal processing unit 22 outputs the output symbols at intervals different from the supply interval of the reception samples.

The initial value deriving unit 23 derives an initial value of the tap coefficient of the FIR filter provided in the signal processing unit 22 at the time of system startup and sets the derived initial value in the FIR filter.

The phase adjustment amount deriving unit 24 derives the phase adjustment amount such that a center of centroids of the respective tap coefficients at respective output time points of the output symbols from the signal processing unit 22 coincides with a center of the number of taps of the FIR filter provided in the signal processing unit 22 and sets the derived phase adjustment amount in the phase adjustment unit 21.

Hereinafter, details of each of the above-described constituent elements of the signal processing circuit 20 will be described.

The signal processing unit 22 is provided with a plurality of FIR filters (first to fourth FIR filters 201, 202, 203, and 204, see FIG. 3) each having a plurality of taps and processes each of the reception samples whose phases have been adjusted by the phase adjustment unit 21 by the plurality of FIR filters. A reception signal received by the optical receiving device 1 is given polarized wave rotation, a loss difference between polarized waves, a delay difference between polarized waves (differential group delay (DGD)), and the like due to characteristics of a transmission path. The characteristics of the transmission path are determined by, for example, temperature, vibration, the length of the transmission path, the material of the transmission path, and the like and continuously vary. The signal processing unit 22 estimates the characteristics of the transmission path and processes the reception sample by the FIR filter having a transfer function corresponding to inverse characteristic of the transmission path, thereby restoring transmission data. The signal processing unit 22 adaptively compensates waveform distortion such as polarized wave rotation, a loss difference between polarized waves, and a DGD difference by changing the tap coefficient of each FIR filter in accordance with a change in the characteristics of the transmission path.

Figure 3:
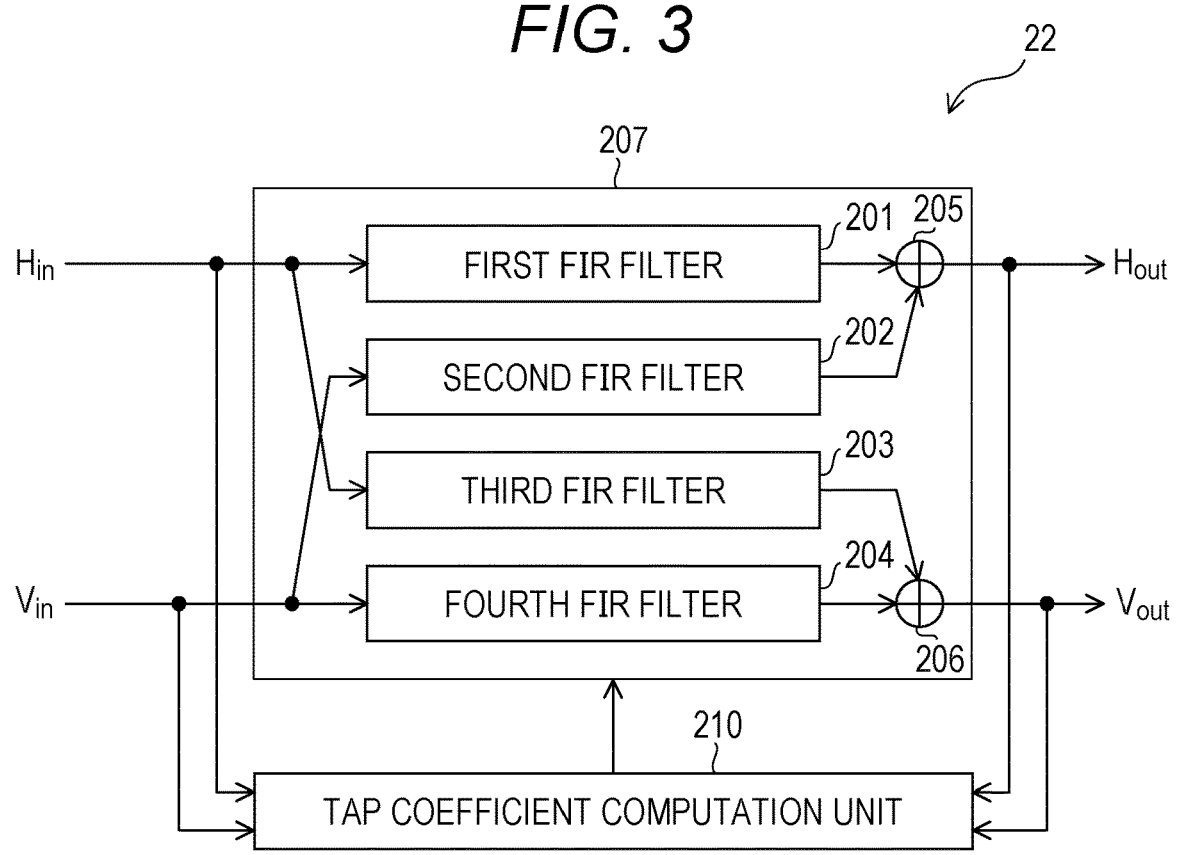
FIG. 3 is a diagram illustrating an example of a configuration of a signal processing unit according to the embodiment of the disclosed technique.

FIG. 3 is a diagram illustrating an example of the configuration of the signal processing unit 22. The signal processing unit 22 has the first FIR filter 201, the second FIR filter 202, the third FIR filter 203, the fourth FIR filter 204, adders 205 and 206, and a tap coefficient computation unit 210. The first to fourth FIR filters 201 to 204 and the adders 205 and 206 constitute a butterfly type FIR filter 207. For example, the H-axis polarized wave component $H_{in}$ of the reception sample is input to the first FIR filter 201 and the third FIR filter 203, and the V-axis polarized wave component $V_{in}$ of the reception sample is input to the second FIR filter 202 and the fourth FIR filter 204. The output of the first FIR filter 201 and the output of the second FIR filter 202 are added by the adder 205 and output as an output symbol $H_{out}$. The output of the third FIR filter 203 and the output of the fourth FIR filter 204 are added by the adder 206 and output as an output symbol $V_{out}$.

The H-axis polarized wave component $H_{in}$ and the V-axis polarized wave component $V_{in}$ of the reception sample are not compensated for the polarized wave rotation and are input to the signal processing unit 22 in a state in which an X polarized wave and a Y polarized wave on a transmitting side are contained together in each of the H-axis polarized wave component $H_{in}$ and the V-axis polarized wave component $V_{in}$. As the H-axis polarized wave component $H_{in}$ and the V-axis polarized wave component $V_{in}$ of the reception sample pass through the butterfly type FIR filter 207, the output symbol $H_{out}$ including only the X polarized wave on the transmitting side and the output symbol $V_{out}$ including only the Y polarized wave on the transmitting side are obtained.

Figure 4:
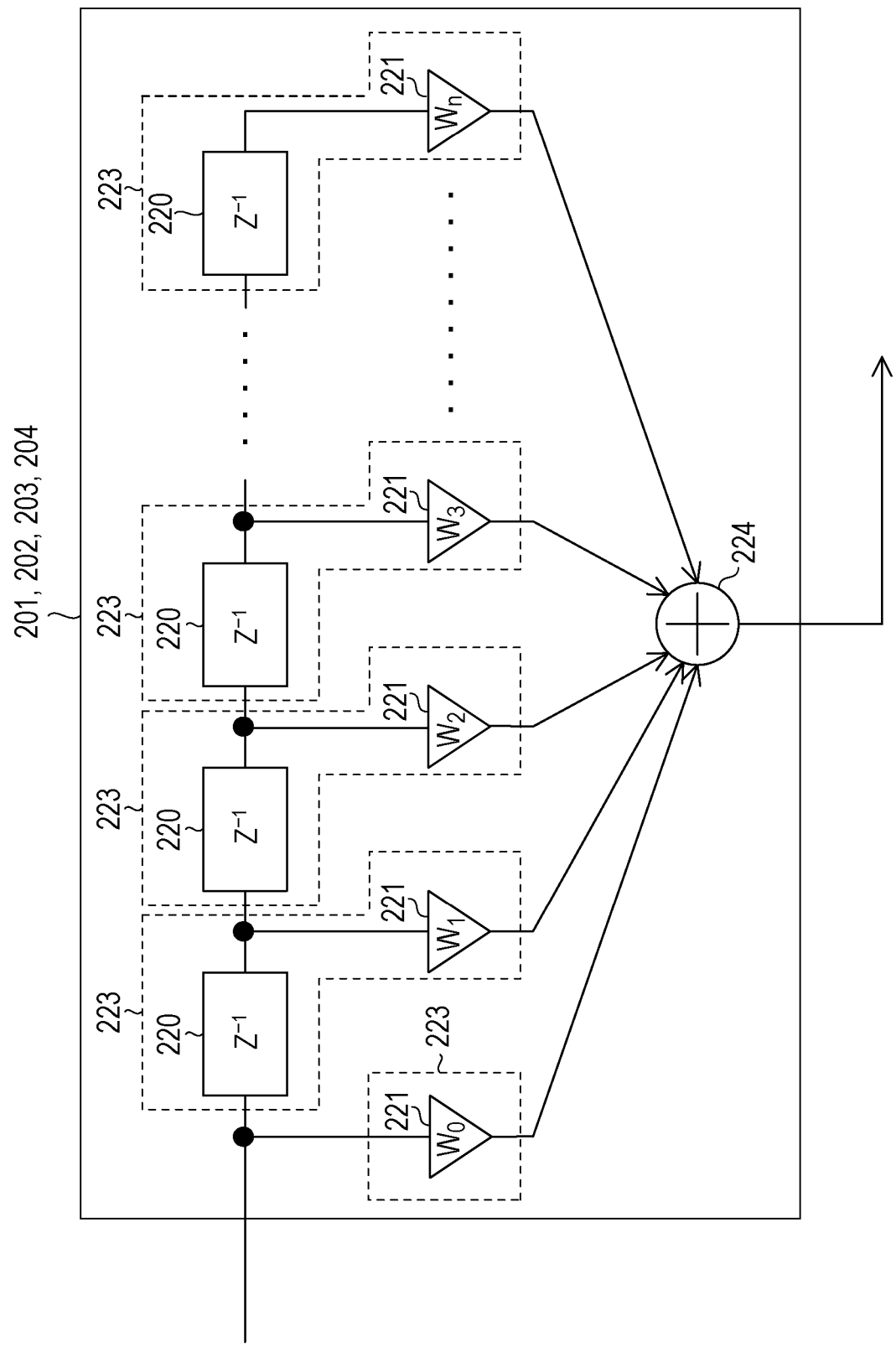
FIG. 4 is a diagram illustrating an example of the configuration of first to fourth FIR filters according to the embodiment of the disclosed technique.

FIG. 4 is a diagram illustrating an example of the configuration of the first to fourth FIR filters 201 to 204. Each of the first to fourth FIR filters 201 to 204 has a plurality of delay registers 220, a plurality of multipliers 221, and an adder 224. Each of the first to fourth FIR filters 201 to 204 has a plurality of taps 223 each constituted by the multiplier 221 or the delay register 220 and the multiplier 221. A weight W set in each of the multipliers 221 corresponds to the tap coefficient of the FIR filter and the number of the multipliers 221 corresponds to the number of taps of the FIR filter. The number of taps N is the same between the first to fourth FIR filters 201 to 204. As the initial value of the tap coefficient, the value derived by the initial value deriving unit 23 at system startup is set.

The signal processing unit 22 outputs the output symbols $H_{out}$ and $V_{out}$ by performing processes indicated by following formulas (1) and (2) using the first to fourth FIR filters 201 to 204. In formulas (1) and (2), t denotes time, n denotes tap numbers of the first to fourth FIR filters 201 to 204, and N denotes the number of taps of the first to fourth FIR filters 201 to 204. $W_{HH}$ denotes the tap coefficient of the first FIR filter 201, $W_{VH}$ denotes the tap coefficient of the second FIR filter 202, $W_{HV}$ denotes the tap coefficient of the third FIR filter 203, and $W_{VV}$ denotes the tap coefficient of the fourth FIR filter 204. As indicated by formulas (1) and (2), the signal processing unit 22 convolutes the tap coefficients of the first to fourth FIR filters 201 to 204 with the reception samples, so as to compensate waveform distortion such as polarized wave rotation, a loss difference between polarized waves, and DGD occurring when the optical signal passes through the transmission path.

[Mathematical Formula 1]

$$H_{out} = \sum_{n=0}^{N-1} W_{HH}[n] \cdot H_{in}[t-n] + \sum_{n=0}^{N-1} W_{VH}[n] \cdot V_{in}[t-n] \quad (1)$$

[Mathematical Formula 2]

$$V_{out} = \sum_{n=0}^{N-1} W_{HV}[n] \cdot H_{in}[t-n] + \sum_{n=0}^{N-1} W_{VV}[n] \cdot V_{in}[t-n] \quad (2)$$

While sequentially updating tap coefficients corresponding to inverse characteristics of the transmission path on the basis of input/output signals (for example, the H-axis polarized wave component $H_{in}$, the V-axis polarized wave component $V_{in}$, the output symbols $H_{out}$ and $V_{out}$) in the signal processing unit 22, the tap coefficient computation unit 210 sets the updated tap coefficient in the respective taps 223 of the first to fourth FIR filters 201 to 204. With this process, waveform distortion such as polarized wave rotation, a loss difference between polarized waves, and DGD occurring when the optical signal passes through the transmission path are adaptively compensated. For example, the tap coefficient computation unit 210 changes the tap coefficients to be set in the respective taps 223 of the first to fourth FIR filters 201 to 204, in accordance with characteristic variations of the transmission path during communication.

Figure 5:
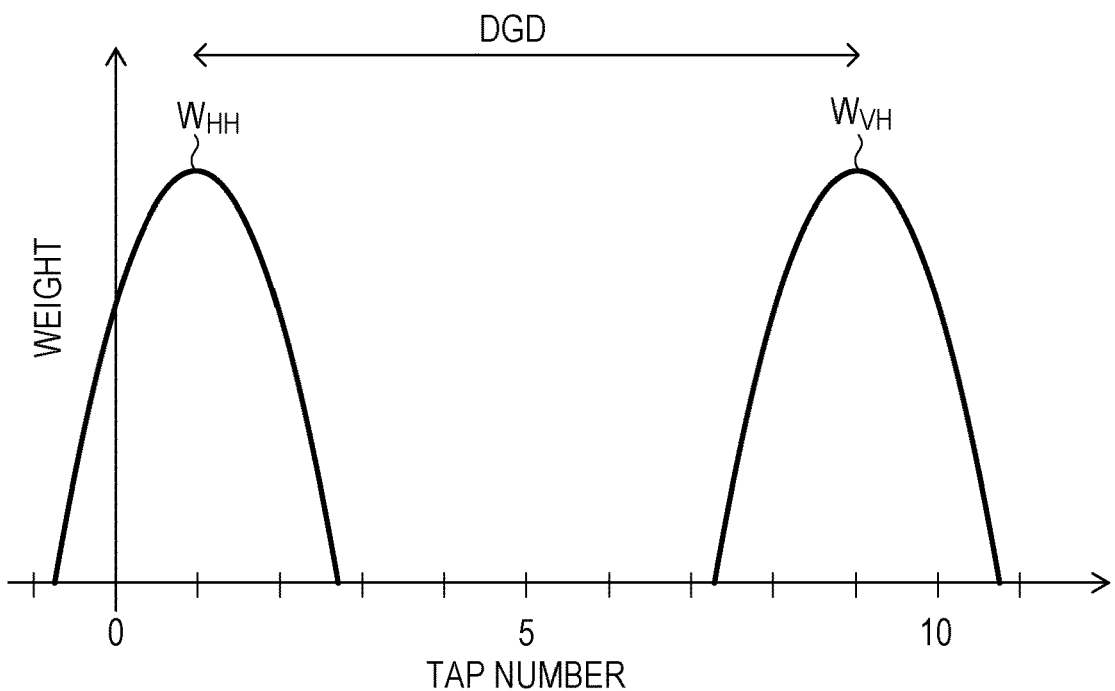
FIG. 5 is a conceptual diagram in which magnitudes of tap coefficients of the first and second FIR filters according to the embodiment of the disclosed technique are expressed by amplitude.

FIG. 5 is a conceptual diagram in which magnitudes of the tap coefficient $W_{HH}$ in the first FIR filter 201 and the tap coefficient $W_{VH}$ in the second FIR filter 202 associated with the generation of the output symbol $H_{out}$ are expressed by amplitude. In FIG. 5, the horizontal axis represents the tap numbers of the first FIR filter 201 and the second FIR filter 202 and the vertical axis represents the magnitudes of the tap coefficients $W_{HH}$ and $W_{VH}$. FIG. 5 illustrates a peak corresponding to the tap coefficients $W_{HH}$ set in the respective taps 223 of the first FIR filter 201 and a peak corresponding to the tap coefficients $W_{VH}$ set in the respective taps 223 of the second FIR filter 202. A distance between the peaks corresponds to DGD to be compensated in the first FIR filter 201 and the second FIR filter 202. For example, DGD is compensated by placing the peak of the tap coefficients $W_{HH}$ and the peak of the tap coefficients $W_{VH}$ away from each other in a tap number direction. The same applies to the tap coefficient $W_{HV}$ in the third FIR filter 203 and the tap coefficient $W_{VV}$ in the fourth FIR filter 204 associated with the generation of the output symbol $V_{out}$.

In the fractional sampling method, the number of reception samples obtained by multiplying the number of transmission symbols transmitted from a transmitting device (not illustrated) by a decimal greater than one (for example, 1.5) is supplied to the signal processing unit 22. The signal processing unit 22 processes the H-axis polarized wave component $H_{in}$ and the V-axis polarized wave component $V_{in}$ of the reception sample by each FIR filter and outputs the same number of output symbols $H_{out}$ and $V_{out}$ as the number of transmission symbols.

Figure 6:
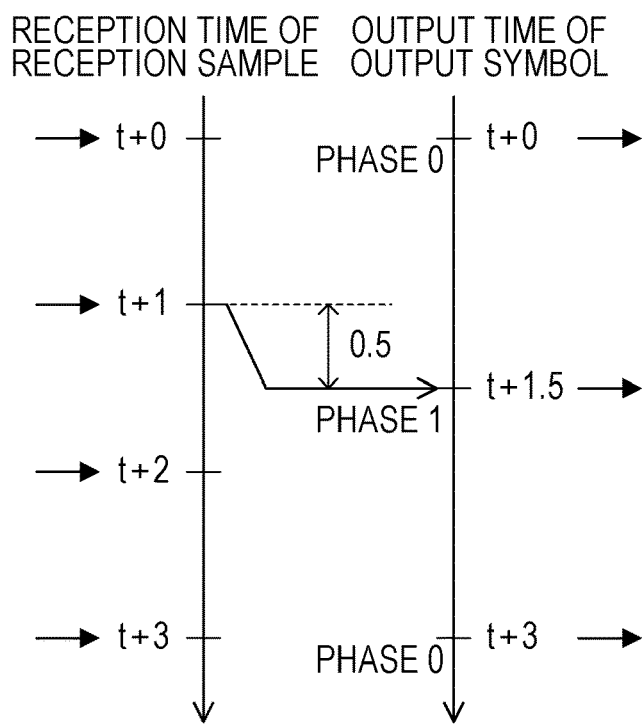
FIG. 6 is a diagram illustrating a correspondence relationship between reception time of reception samples and output time of output symbols in the signal processing unit in the case of 1.5 times sampling.

FIG. 6 is a diagram illustrating a correspondence relationship between reception time of the reception samples and output time of the output symbols in the signal processing unit 22 in the case of 1.5 times sampling. In the case of 1.5 times sampling, the signal processing unit 22 receives the reception samples three times and outputs the output symbols twice such that the number of output symbols coincides with the number of transmission symbols from the transmitting device (not illustrated). Therefore, the signal processing unit 22 outputs the output symbols at intervals different from the supply interval of the reception samples. Output time t+0 and output time t+3 of the output symbols correspond to reception time t+0 and reception time t+3 of the reception samples, respectively. This state is defined as phase 0. Note that phase 0 means that the reception time of the reception sample and the output time of the output symbol are in a correspondence relationship but does not mean that the reception time and the output time coincide with each other. The output time of the output symbol is usually delayed with respect to the reception time of the corresponding reception sample. On the other hand, output time t+1.5 of the output symbol does not correspond to any reception time of the reception sample but is deviated by +0.5 samples from reception time t+1 of the reception sample. In addition, the output time t+1.5 of the output symbol is deviated by −0.5 samples (not illustrated) from reception time t+2 of the reception sample. This state is defined as phase 1. In the case of 1.5 times sampling, the state of phase 0 and the state of phase 1 are alternately repeated.

In 1.5 times sampling, an output symbol $H_{out}[t+0]$ at the phase 0 timing (time t+0) is indicated by following formula (3) and an output symbol $H_{out}[t+1.5]$ at the phase 1 timing (time t+1.5) is indicated by following formula (4).

[Mathematical Formula 3]

$$H_{out}[t+0] = \sum_{n=0}^{N-1} W_{HH}[n] \cdot H_{in}[t-n] + \sum_{n=0}^{N-1} W_{VH}[n] \cdot V_{in}[t-n] \quad (3)$$

[Mathematical Formula 4]

$$H_{out}[t+1.5] = \sum_{n=0}^{N-1} W_{HH}[n] \cdot H_{in}[t+1.5-n] + \sum_{n=0}^{N-1} W_{VH}[n] \cdot V_{in}[t+1.5-n] \quad (4)$$

In formula (4), however, since there are actually no reception samples corresponding to $H_{in}[t+1.5-n]$, it is expected to find $H_{out}[t+1.5]$ from an actual reception sample (for example, a reception sample $H_{in}[t+1]$ at the time t+1). When $H_{out}[t+1.5]$ is found from the reception sample $H_{in}[t+1]$ at the time t+1, $W_{HH}'$ obtained by delaying the tap coefficient $W_{HH}$ at phase 0 and $W_{VH}'$ obtained by delaying the tap coefficient $W_{VH}$ at phase 0 are utilized for phase 1. It is also practicable to find $H_{out}[t+1.5]$ from a reception sample $H_{in}[t+2]$ at the time t+2.

Figure 7:
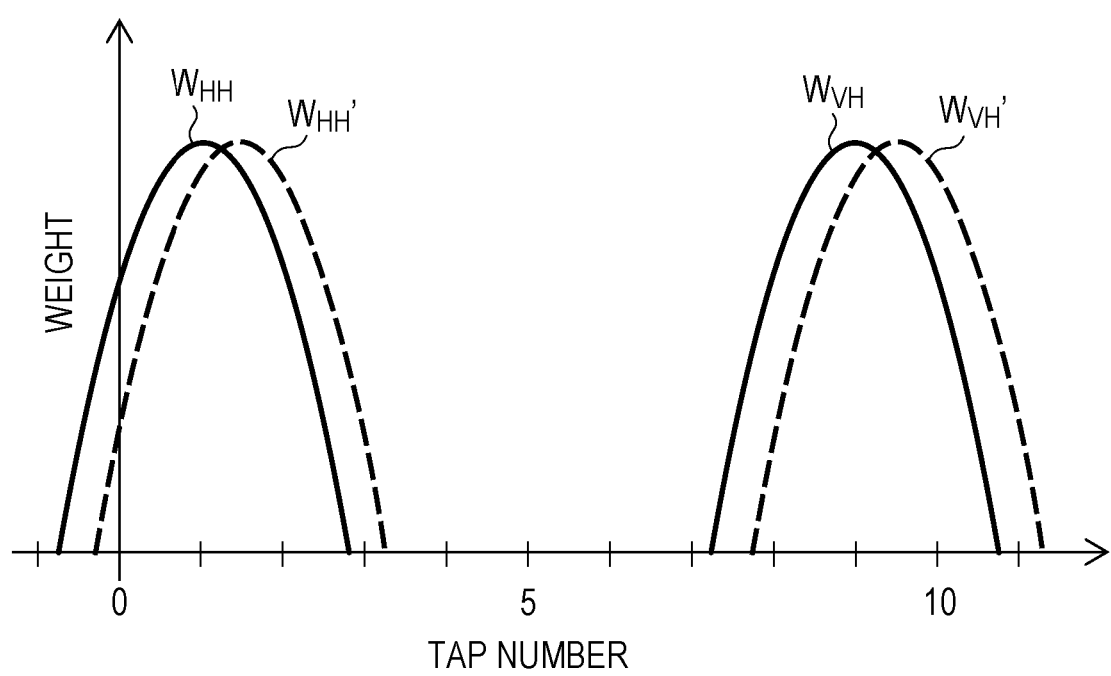
FIG. 7 is a conceptual diagram of tap coefficients at phase 0 of 1.5 times sampling and tap coefficients at phase 1 of 1.5 times sampling.

FIG. 7 is a conceptual diagram of tap coefficients $W_{HH}$ and $W_{VH}$ at phase 0 of 1.5 times sampling and tap coefficients $W_{HH}'$ and $W_{VH}'$ at phase 1 of 1.5 times sampling. FIG. 7 exemplifies a case where the tap coefficient $W_{HH}'$ at phase 1 is shifted in a delay direction (a direction in which the tap number becomes greater) with respect to the tap coefficient $W_{HH}$ at phase 0 and the tap coefficient $W_{VH}'$ at phase 1 is shifted in the delay direction (the direction in which the tap number becomes greater) with respect to the tap coefficient $W_{VH}$ at phase 0. The shift amounts of the tap coefficients $W_{HH}'$ and $W_{VH}'$ with respect to the tap coefficients $W_{HH}$ and $W_{VH}$ are determined by a fractional sampling rate and, for example, in the case of 1.5 times sampling, the shift amount is 0.5 samples (0.5 taps).

Using the tap coefficients $W_{HH}'$ and $W_{VH}'$, the output symbol $H_{out}[t+1.5]$ at phase 1 (time t+1.5) can be found from the actual reception sample (here, $H_{in}[t+1]$), as indicated by following formula (5). It is also practicable to find $H_{out}[t+1.5]$ from $H_{in}[t+2]$ using a tap coefficient whose shift amount from phase 0 is −0.5 samples (−0.5 taps).

[Mathematical Formula 5]

$$H_{out}[t+1.5] = \sum_{n=0}^{N-1} W'_{HH}[n] \cdot H_{in}[t+1-n] + \sum_{n=0}^{N-1} W'_{VH}[n] \cdot V_{in}[t+1-n] \quad (5)$$

Figure 8A:
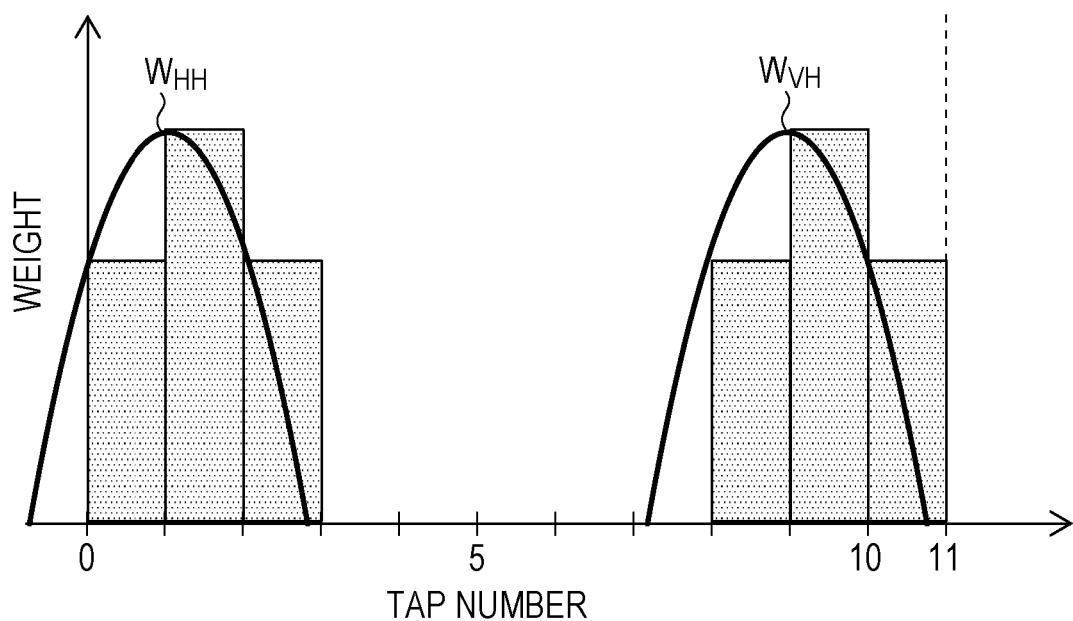
FIG. 8A is a conceptual diagram illustrating an example of tap coefficients at phase 0 of 1.5 times sampling.
Figure 8B:
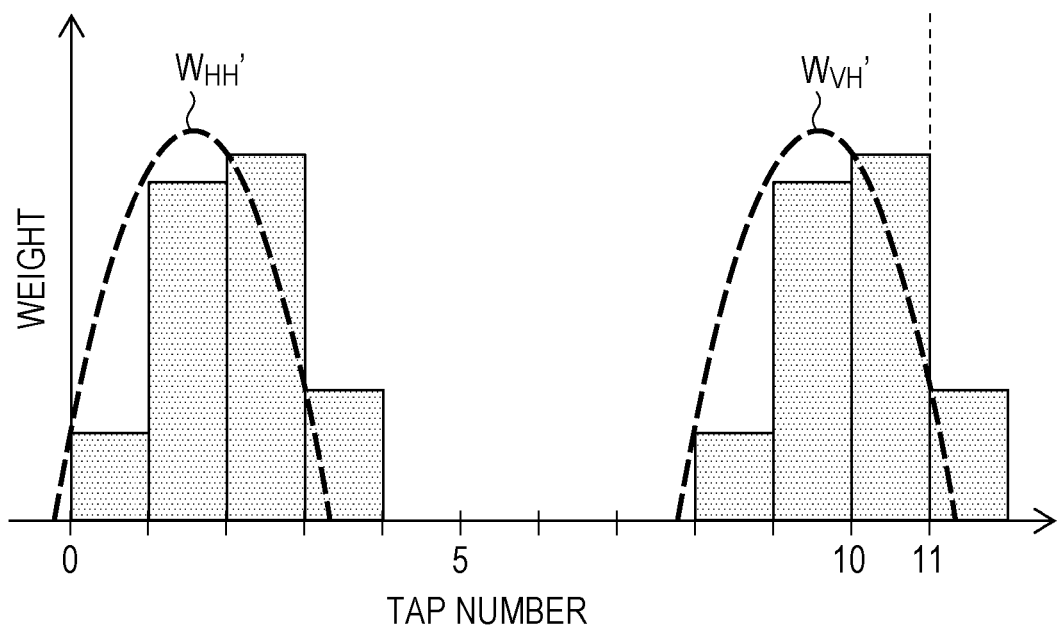
FIG. 8B is a conceptual diagram illustrating an example of tap coefficients at phase 1 of 1.5 times sampling.

However, when the tap coefficient at phase 0 is shifted at phase 1 as described above, the number of taps of the first to fourth FIR filters 201 to 204 may become insufficient. FIG. 8A is a conceptual diagram illustrating an example of the tap coefficients $W_{HH}$ and $W_{VH}$ at phase 0 of 1.5 times sampling. FIG. 8B is a conceptual diagram illustrating an example of the tap coefficients $W_{HH}'$ and $W_{VH}'$ at phase 1 of 1.5 times sampling. It is assumed that each of the first FIR filter 201 and the second FIR filter 202 has eleven taps with tap numbers 0 to 10 (the number of taps N=11).

As illustrated in FIG. 8A, in the case of phase 0, the tap coefficients (weights) fall within the range from the tap number 0 to the tap number 10. Therefore, it is supposed to obtain desired filter characteristics by the FIR filter with eleven taps.

On the other hand, as illustrated in FIG. 8B, in the case of phase 1, a tap coefficient (weight) exists outside the tap number 10 and the number of taps becomes insufficient. In this case, depending on the FIR filter with eleven taps, desired filter characteristics are not properly obtained and there is a possibility that a desired compensation capability is not fully exhibited. In order to deal with this phenomenon, it is conceivable to increase the number of taps of the FIR filter, but in this case, the circuit scale is enlarged and the power consumption grows. This problem is dealt with by the phase adjustment amount deriving unit 24 and the phase adjustment unit 21.

The phase adjustment amount deriving unit 24 derives the phase adjustment amount so as to suppress an insufficiency in the number of taps. The phase adjustment unit 21 adjusts the phase of the reception sample according to the phase adjustment amount derived by the phase adjustment amount deriving unit 24. Note that "adjusting the phase of the reception sample" means shifting the phase of the reception sample in a time axis direction. Shifting the phase of the reception sample in the time axis direction is synonymous with deviating the tap coefficients of the first to fourth FIR filters 201 to 204 in the tap number direction. The phase adjustment unit 21 adjusts the phase of the reception sample according to the phase adjustment amount derived by the phase adjustment amount deriving unit 24, whereby the risk of the occurrence of an insufficiency in the number of taps as exemplified in FIG. 8B is suppressed. The following description will exemplify a case where the phase adjustment amount is derived using the tap coefficients of the first FIR filter 201 and the second FIR filter 202 associated with the generation of the output symbol $H_{out}$.

Figure 9A:
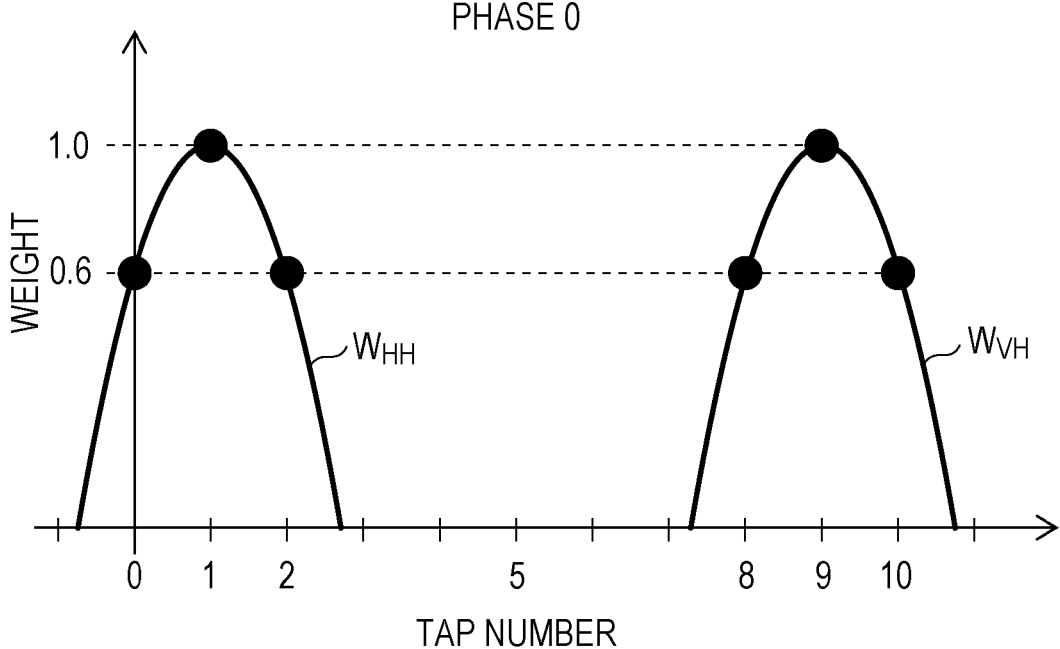
FIG. 9A is a conceptual diagram illustrating an example of initial tap coefficients at phase 0 of 1.5 times sampling.

FIG. 9A is a conceptual diagram illustrating an example of initial tap coefficients $W_{HH}$ and $W_{VH}$ at phase 0 of 1.5 times sampling. The initial tap coefficient at phase 0 is the initial value of the tap coefficient derived by the initial value deriving unit 23.

Figure 9B:
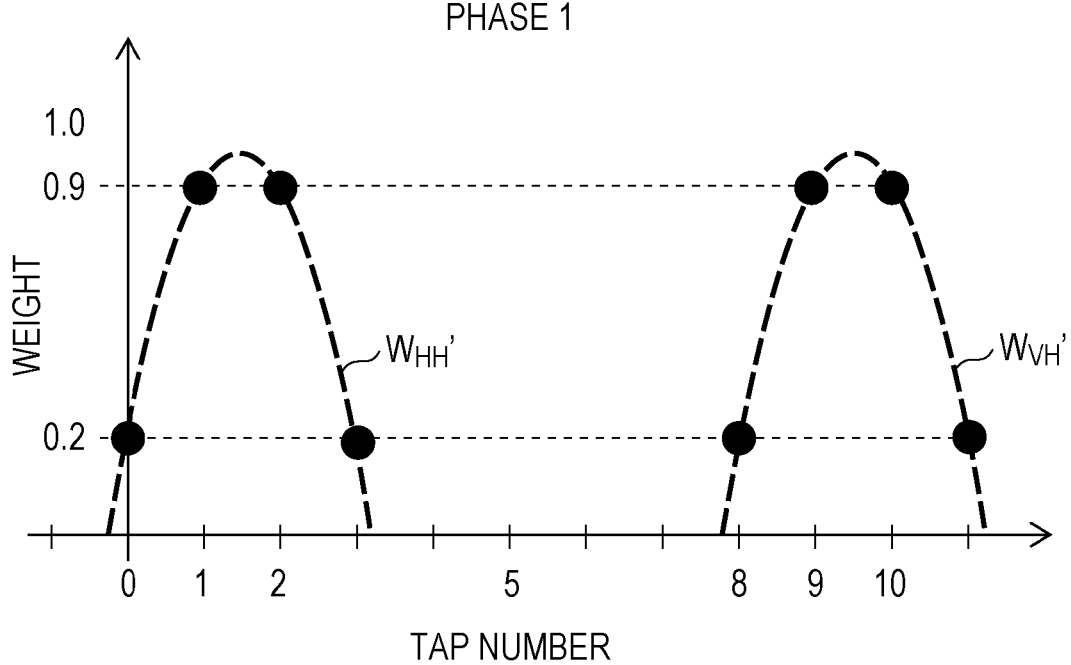
FIG. 9B is a conceptual diagram illustrating an example of initial tap coefficients at phase 1 of 1.5 times sampling.

FIG. 9B is a conceptual diagram illustrating an example of initial tap coefficients $W_{HH}'$ and $W_{VH}'$ at phase 1 of 1.5 times sampling. The initial tap coefficients at phase 1 can be found from the initial tap coefficients $W_{HH}$ and $W_{VH}$ at phase 0 and the fractional sampling rate (a deviation between the supply interval of the reception sample and the output interval of the output symbol).

Here, a centroid G of the tap coefficients in each state of phases 0 and 1 is defined by following formula (6). In formula (6), i denotes the tap number and $W_i$ denotes the tap coefficient at the tap number i.

[Mathematical Formula 6]

$$G = \frac{\sum_{i}(i \times W_i)}{\sum_{i} W_i} \tag{6}$$

An example of working out a centroid $G_0$ of the tap coefficients at phase 0 is indicated by following formula (7). The calculation example indicated by formula (7) corresponds to FIG. 9A. In this example, $G_0=5$ is worked out. An example of working out a centroid $G_1$ of the tap coefficients at phase 1 is indicated by following formula (8). The calculation example indicated by formula (8) corresponds to FIG. 9B. In this example, $G_1=5.5$ is worked out.

[Mathematical Formula 7]

$$G_0 = \frac{\begin{array}{c}0\times 0.6 + 1\times 1 + 2\times 0.6 + 3\times 0 + 4\times 0 + \\ 5\times 0 + 6\times 0 + 7\times 0 + 8\times 0.6 + 9\times 1 + 10\times 0.6\end{array}}{0.6+1+0.6+0+0+0+0+0+0.6+1+0.6} = 5 \tag{7}$$

[Mathematical Formula 8]

$$G_1 = \frac{\begin{array}{c}0\times 0.2 + 1\times 0.9 + 2\times 0.2 + 3\times 0.9 + 4\times 0.2 + 5\times \\ 0 + 6\times 0 + 7\times 0 + 8\times 0.2 + 9\times 0.9 + 10\times 0.9 + 11\times 0.2\end{array}}{0.2+0.9+0.9+0.2+0+0+0+0+0.2+0.9+0.9+0.2} = 5.5 \tag{8}$$

Figure 10A:
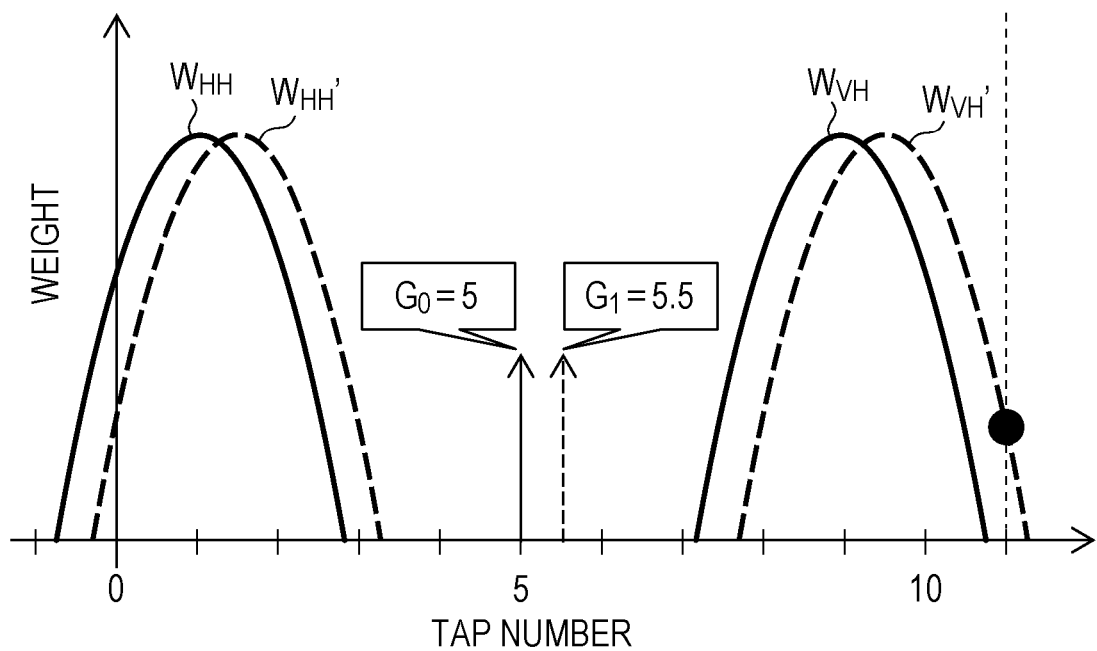
FIG. 10A is a conceptual diagram illustrating initial tap coefficients at phases 0 and 1 together with the centroids.
Figure 10B:
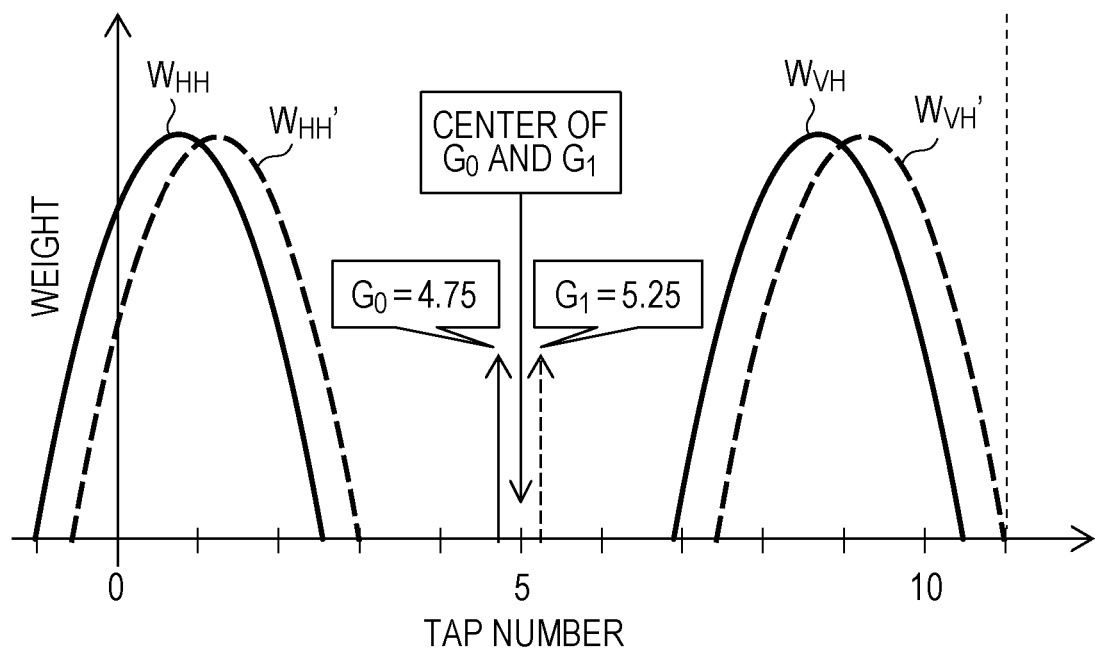
FIG. 10B is a conceptual diagram illustrating tap coefficients at phases 0 and 1 after phase adjustment of reception sample, together with the centroids.

FIG. 10A is a conceptual diagram illustrating initial tap coefficients $W_{HH}$ and $W_{VH}$ at phase 0 and initial tap coefficients $W_{HH}'$ and $W_{VH}'$ at phase 1, together with the centroids $G_0$ (=5.0) and $G_1$ (=5.5). The phase adjustment unit 21 adjusts the phase of the reception sample according to the phase adjustment amount derived by the phase adjustment amount deriving unit 24; consequently, the initial tap coefficients $W_{HH}$, $W_{VH}$, $W_{HH}'$, and $W_{VH}'$ are shifted in the tap number direction and the center of the centroids $G_0$ and $G_1$ coincide with a center $N_C$ of the number of taps. For example, the phase adjustment amount deriving unit 24 derives the phase adjustment amount such that the center of the centroids $G_0$ and $G_1$ coincide with the center $N_C$ of the number of taps of the first FIR filter 201 and the second FIR filter 202. The center $N_C$ of the number of taps N is defined by following formula (9). FIG. 10B is a conceptual diagram illustrating the tap coefficients $W_{HH}$ and $W_{VH}$ at phase 0 and the tap coefficients $W_{HH}'$ and $W_{VH}'$ at phase 1 after phase adjustment of the reception sample, together with the centroids $G_0$ (=4.75) and $G_1$ (=5.25). FIG. 10B exemplifies a state in which the centroid $G_0$ of the tap coefficients $W_{HH}$ and $W_{VH}$ at phase 0 is shifted from 5 to 4.75, the centroid $G_1$ of the tap coefficients $W_{HH}'$ and $W_{VH}'$ at phase 1 is shifted from 5.5 to 5.25, and the center of the centroids $G_0$ and $G_1$ coincides with the center $N_C$ of the number of taps N (=5 (in the case of the number of taps N=11)). By making the center of the centroids $G_0$ and $G_1$ coincident with the center $N_C$ of the number of taps N, the risk of the occurrence of an insufficiency in the number of taps as exemplified in FIG. 8B is suppressed.

[Mathematical Formula 9]

$$N_c = \frac{N-1}{2} \tag{9}$$

FIG. 11 is a flowchart illustrating an example of a flow of a process of deriving the phase adjustment amount, which is carried out in the phase adjustment amount deriving unit 24. When the system is started up, the initial value deriving unit 23 derives the initial values of the tap coefficients $W_{HH}$ and $W_{VH}$ of the first FIR filter 201 and the second FIR filter 202 at phase 0.

In step S1, the phase adjustment amount deriving unit 24 acquires the initial values of the tap coefficients $W_{HH}$ and $W_{VH}$ of the first FIR filter 201 and the second FIR filter 202 at phase 0 derived by the initial value deriving unit 23.

In step S2, the phase adjustment amount deriving unit 24 derives the centroid $G_0$ of the initial values of the tap coefficients $W_{HH}$ and $W_{VH}$ at phase 0 by performing the computation indicated by formula (6). The initial value deriving unit 23 may perform the process of deriving the centroid $G_0$ of the initial values of the tap coefficients $W_{HH}$ and $W_{VH}$ at phase 0.

In step S3, the phase adjustment amount deriving unit 24 acquires the amount of deviation between the supply timing of the reception sample and the output timing of the output symbol (hereinafter referred to as timing deviation amount) at each phase. The timing deviation amount is an amount fixed in advance according to the fractional sampling rate. For example, in the case of 1.5 times sampling (fractional sampling rate 1.5), the state of phase 1 exists as a state other than phase 0 as illustrated in FIG. 6 and the timing deviation amount at phase 1 is, for example, 0.5 with the time t+1 as a reference (see table 1 below).

Figure 12A:
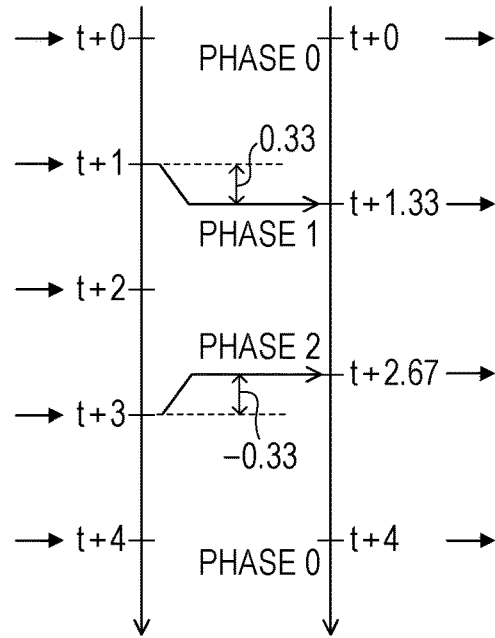
FIG. 12A is a diagram illustrating an example of a correspondence relationship between reception time of reception samples and output time of output symbols in the signal processing unit in the case of 1.33 times sampling.

FIG. 12A is a diagram illustrating an example of a correspondence relationship between reception time of the reception samples and output time of the output symbols in the signal processing unit 22 in the case of 1.33 times sampling (fractional sampling rate 1.33). In the case of 1.33 times sampling, the signal processing unit 22 receives the reception samples four times and outputs the output symbols three times. Consequently, the number of output symbols coincides with the number of transmission symbols from the transmitting device (not illustrated). Output time t+0 and output time t+4 of the output symbols correspond to reception time t+0 and reception time t+4 of the reception samples, respectively. This state is regarded as phase 0. On the other hand, output time t+1.33 of the output symbol does not correspond to any reception time of the reception sample but is deviated by, for example, 0.33 samples from reception time t+1 of the reception sample. In addition, the output time t+1.33 of the output symbol is deviated by −0.67 samples (not illustrated) from reception time t+2 of the reception sample. This state is defined as phase 1. Furthermore, output time t+2.67 of the output symbol does not correspond to any reception time of the reception sample but is deviated by, for example, −0.33 samples from reception time t+3 of the reception sample. In addition, the output time t+2.67 of the output symbol is deviated by 0.67 samples (not illustrated) from the reception time t+2 of the reception sample. This state is defined as phase 2. As described above, in the case of 1.33 times sampling, phases 1 and 2 exist as states other than phase 0; the timing deviation amount at phase 1 is, for example, 0.33 with the time t+1 as a reference and the timing deviation amount at phase 2 is, for example, −0.33 with the time t+3 as a reference (see table 1 below).

Figure 12B:
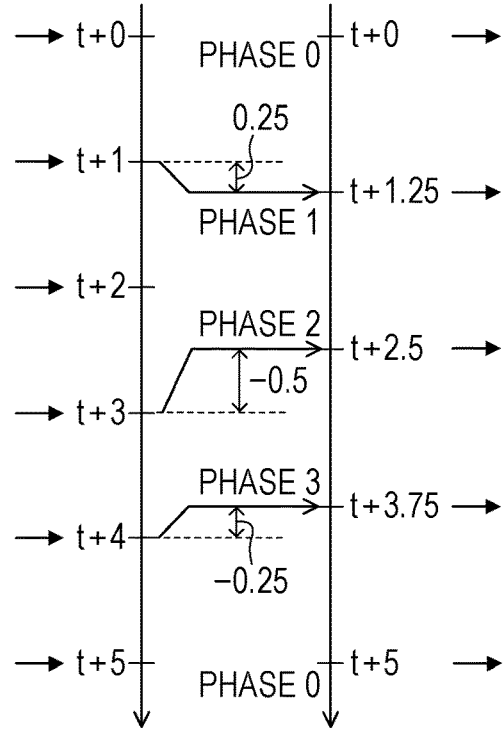
FIG. 12B is a diagram illustrating an example of a correspondence relationship between reception time of reception samples and output time of output symbols in the signal processing unit in the case of 1.25 times sampling.

FIG. 12B is a diagram illustrating an example of a correspondence relationship between reception time of the reception samples and output time of the output symbols in the signal processing unit 22 in the case of 1.25 times sampling (fractional sampling rate 1.25). In the case of 1.25 times sampling, the signal processing unit 22 receives the reception samples five times and outputs the output symbols four times. Consequently, the number of output symbols coincides with the number of transmission symbols from the transmitting device (not illustrated). Output time t+0 and output time t+5 of the output symbols correspond to reception time t+0 and reception time t+5 of the reception samples, respectively. This state is defined as phase 0. On the other hand, output time t+1.25 of the output symbol does not correspond to any reception time of the reception sample but is deviated by, for example, 0.25 samples from reception time t+1 of the reception sample. In addition, the output time t+1.25 of the output symbol is deviated by −0.75 samples (not illustrated) from reception time t+2 of the reception sample. This state is defined as phase 1. Furthermore, output time t+2.5 of the output symbol does not correspond to any reception time of the reception sample but is deviated by, for example, −0.5 samples from reception time t+3 of the reception sample. In addition, the output time t+2.5 of the output symbol is deviated by 0.5 samples (not illustrated) from the reception time t+2 of the reception sample. This state is defined as phase 2. Additionally, output time t+3.75 of the output symbol does not correspond to any reception time of the reception sample but is deviated by, for example, −0.25 samples from reception time t+4 of the reception sample. In addition, the output time t+3.75 of the output symbol is deviated by 0.75 samples (not illustrated) from the reception time t+3 of the reception sample. This state is defined as phase 3. As described above, in the case of 1.25 times sampling, phases 1, 2, and 3 exist as states other than phase 0. For example, the timing deviation amount at phase 1 is 0.25 with the time t+1 as a reference. For example, the timing deviation amount at phase 2 is −0.5 with the time t+3 as a reference. For example, the timing deviation amount at phase 3 is −0.25 with the time t+4 as a reference (see table 1 below).

In step S4, the phase adjustment amount deriving unit 24 derives a center $D_C$ of the timing deviations at the respective phases. The center $D_C$ of the timing deviations corresponds to the center value (the average value between the maximum value and the minimum value) of the timing deviation amounts at the respective phases.

For example, in the case of 1.5 times sampling, if the timing deviation amount at each phase is as exemplified above, the timing deviation amount at phase 1 takes the maximum value 0.5 and the timing deviation amount at phase 0 takes the minimum value 0. Therefore, the center $D_C$ of the timing deviations is 0.25 (see table 1 below).

In the case of 1.33 times sampling, if the timing deviation amount at each phase is as exemplified above, the timing deviation amount at phase 1 takes the maximum value 0.33 and the timing deviation amount at phase 2 takes the minimum value −0.33. Therefore, the center $D_C$ of the timing deviations is 0 (see table 1 below).

In the case of 1.25 times sampling, if the timing deviation amount at each phase is as exemplified above, the timing deviation amount at phase 1 takes the maximum value 0.25 and the timing deviation amount at phase 2 takes the minimum value −0.5. Therefore, the center $D_C$ of the timing deviations is −0.125 (see table 1 below).

In step S5, the phase adjustment amount deriving unit 24 derives the center $N_C$ of the number of taps N of the first FIR filter 201 and the second FIR filter 202 by performing the computation indicated by formula (9). Here, in the phase adjustment amount deriving unit 24, the number of taps N of the first FIR filter 201 and the second FIR filter 202 is assumed to be known. In addition, in the phase adjustment amount deriving unit 24, the center $N_C$ of the number of taps N may be assumed to be known. In this case, it is feasible to omit the process of present step S5.

In step S6, the phase adjustment amount deriving unit 24 derives the phase adjustment amount C by performing the computation indicated by following formula (10).

[Mathematical Formula 10]

$$C = D_C + G_0 - N_C \quad (10)$$

Table 1 illustrates an example of the timing deviation amount for each phase, the center $D_C$ of the timing deviations, and the phase adjustment amount C in respective cases where the fractional sampling rate is specified as 1.5, 1.33, and 1.25. Here, the number of taps N of the first and second FIR filters 201 and 202 is assumed as 11 and the centroid of the tap coefficients at phase 0 is assumed as 5.

TABLE 1

| Fractional Sampling Rate | Timing Deviation Amount | | | | Center $D_C$ of Timing Deviations | Phase Adjustment Amount C |
|---|---|---|---|---|---|---|
| | Phase 0 | Phase 1 | Phase 2 | Phase 3 | | |
| 1.5 | 0 | 0.5 | — | — | 0.25 | 0.25 |
| 1.33 | 0 | 0.33 | −0.33 | — | 0 | 0 |
| 1.25 | 0 | 0.25 | −0.5 | −0.25 | −0.125 | −0.125 |

The phase adjustment amount C derived by the phase adjustment amount deriving unit 24 is set in the phase adjustment unit 21. The phase adjustment unit 21 adjusts the phase of the reception sample according to the set phase adjustment amount C. For example, the phase adjustment unit 21 shifts the phase of the H-axis polarized wave component $H_{in}$ and the phase of the V-axis polarized wave component $V_{in}$ of the reception sample in the time axis direction by a shift amount corresponding to the phase adjustment amount C. With this process, as illustrated in FIG. 10B, the initial tap coefficient is shifted in the tap number direction and a center $G_C$ of the centroids of the tap coefficients coincides with the center $N_C$ of the number of taps, whereby the risk of the occurrence of insufficiency as exemplified in FIG. 8B is suppressed.

The above explanation has exemplified a case where the deviation amount (0.5) when the reception time t+1 of the reception sample is used as a reference is applied as the timing deviation amount at phase 1 in the case of 1.5 times sampling; however, it is also possible to apply the deviation amount (−0.5) when the reception time t+2 is used as a reference.

In addition, a case where the deviation amount (0.33) when the reception time t+1 of the reception sample is used as a reference is applied as the timing deviation amount at phase 1 in 1.33 times sampling has been exemplified; however, it is also possible to apply the deviation amount (−0.67) when the reception time t+2 is used as a reference. A case where the deviation amount (−0.33) when the reception time t+3 of the reception sample is used as a reference is applied as the timing deviation amount at phase 2 in 1.33 times sampling has been exemplified; however, it is also possible to apply the deviation amount (0.67) when the reception time t+2 is used as a reference.

A case where the deviation amount (0.25) when the reception time t+1 of the reception sample is used as a reference is applied as the timing deviation amount at phase 1 in 1.25 times sampling has been exemplified; however, it is also possible to apply the deviation amount (−0.75) when the reception time t+2 is used as a reference.

A case where the deviation amount (−0.5) when the reception time t+3 of the reception sample is used as a reference is applied as the timing deviation amount at phase 2 in 1.25 times sampling has been exemplified; however, it is also possible to apply the deviation amount (0.5) when the reception time t+2 is used as a reference.

A case where the deviation amount (−0.25) when the reception time t+4 of the reception sample is used as a reference is applied as the timing deviation amount at phase 3 in 1.25 times sampling has been exemplified; however, it is also possible to apply the deviation amount (0.75) when the reception time t+3 is used as a reference.

Figure 13:
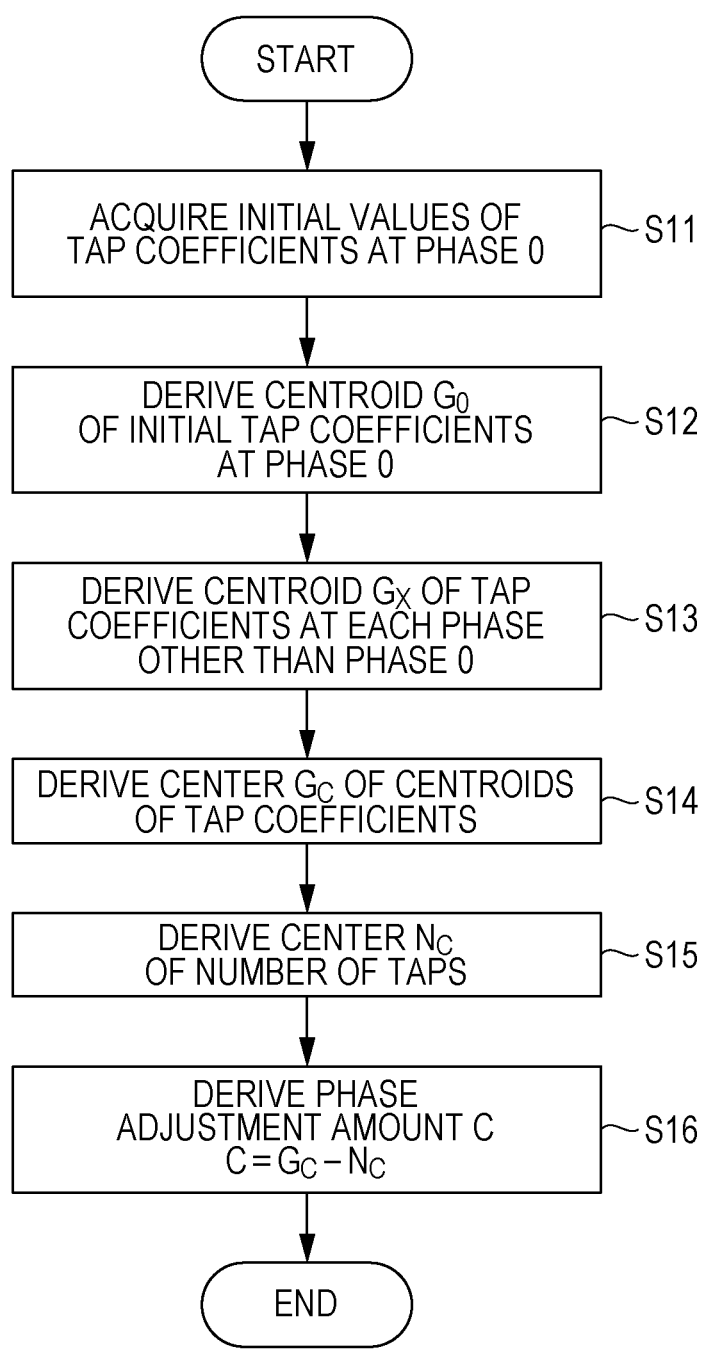
FIG. 13 is a flowchart illustrating another example of a flow of a process of deriving a phase adjustment amount, which is carried out in the phase adjustment amount deriving unit according to the embodiment of the disclosed technique.

FIG. 13 is a flowchart illustrating another example of a flow of a process of deriving a phase adjustment amount, which is carried out in the phase adjustment amount deriving unit 24. When the system is started up, the initial value deriving unit 23 derives the initial values of the tap coefficients $W_{HH}$ and $W_{VH}$ of the first FIR filter 201 and the second FIR filter 202 at phase 0.

In step S11, the phase adjustment amount deriving unit 24 acquires the initial values of the tap coefficients $W_{HH}$ and $W_{VH}$ of the first FIR filter 201 and the second FIR filter 202 at phase 0 derived by the initial value deriving unit 23.

In step S12, the phase adjustment amount deriving unit 24 derives the centroid $G_0$ of the initial values of the tap coefficients $W_{HH}$ and $W_{VH}$ at phase 0 by performing the computation indicated by formula (6). The initial value deriving unit 23 may perform the process of deriving the centroid $G_0$ of the initial values of the tap coefficients $W_{HH}$ and $W_{VH}$.

In step S13, the phase adjustment amount deriving unit 24 derives a centroid $G_X$ of the tap coefficients for each phase other than phase 0. For example, the phase adjustment amount deriving unit 24 may derive the centroid $G_X$ of the tap coefficients at each phase by working out a shift amount from the centroid $G_0$ at each phase from the timing deviation amount (the amount of deviation between the supply timing of the reception sample and the output timing of the output symbol) at each phase other than phase 0 and shifting the centroid $G_0$ according to the worked-out shift amount.

In step S14, the phase adjustment amount deriving unit 24 derives the center value (the average value between the maximum value and the minimum value) of the centroids of the tap coefficients at the respective phases as the center $G_C$ of the centroids of the tap coefficients.

In step S15, the phase adjustment amount deriving unit 24 derives the center $N_C$ of the number of taps N of the first FIR filter 201 and the second FIR filter 202 by performing the computation indicated by formula (9). Here, in the phase adjustment amount deriving unit 24, the number of taps N of the first FIR filter 201 and the second FIR filter 202 is assumed to be known. In addition, in the phase adjustment amount deriving unit 24, the center $N_C$ of the number of taps N may be assumed to be known. In this case, it is feasible to omit the process of present step S15.

In step S16, the phase adjustment amount deriving unit 24 derives the phase adjustment amount C by performing the computation indicated by following formula (11).

[Mathematical Formula 11]

$$C = G_C - N_c \qquad (11)$$

Table 2 illustrates an example of the centroid for each phase, the center $G_C$ of the centroids, and the phase adjustment amount C in respective cases where the fractional sampling rate is 1.5, 1.33, and 1.25. Here, the number of taps N of the first and second FIR filters 201 and 202 is assumed as 11 and the centroid of the tap coefficients at phase 0 is assumed as 5.

TABLE 2

| Fractional Sampling Rate | Centroid | | | | Center $G_C$ of Centroids | Phase Adjustment Amount C |
| --- | --- | --- | --- | --- | --- | --- |
| | Phase 0 | Phase 1 | Phase 2 | Phase 3 | | |
| 1.5 | 5 | 5.5 | — | — | 5.25 | 0.25 |
| 1.33 | 5 | 5.33 | 4.67 | — | 5 | 0 |
| 1.25 | 5 | 5.25 | 4.5 | 4.75 | 4.875 | −0.125 |

The above description has exemplified a case where the phase adjustment amount is derived using the tap coefficients of the first FIR filter 201 and the second FIR filter 202, but the present invention is not limited to this mode. The phase adjustment amount deriving unit may derive the phase adjustment amount using the tap coefficients of the third FIR filter 203 and the fourth FIR filter 204.

As described above, the phase adjustment amount deriving unit 24 derives the phase adjustment amount such that the center $G_C$ of the centroids of the tap coefficients at respective output time points (respective phases) of the output symbols coincides with the center $N_C$ of the number of taps N of the FIR filter. The phase adjustment unit 21 adjusts the phase of the reception sample according to the phase adjustment amount derived by the phase adjustment amount deriving unit 24. This makes it easier to suppress the risk of the occurrence of an insufficiency in the number of taps of the FIR filter when fractional sampling is applied. A desired DGD compensation capability may be ensured by hindering the occurrence of an insufficiency in the number of taps of the FIR filter. Therefore, an optical fiber having a large DGD is allowed to be used more freely and a high compensation capability is implemented more simply even in existing facilities. It may be said that, according to the optical receiving device 1 and the signal processing circuit 20 according to the embodiment of the disclosed technique, a desired compensation capability is satisfactorily ensured in the signal processing circuit 20 without increasing the number of taps of the FIR filter.

Furthermore, according to the processing mode illustrated in the flowchart in FIG. 11, since the centroid does not have to be derived for each phase other than phase 0, the computation amount may be reduced.

Meanwhile, according to the processing mode illustrated in the flowchart in FIG. 13, since the phase adjustment amount C is derived using the centroids of all the phases, the phase adjustment amount C may be derived with higher accuracy.

The above description has exemplified a case where the fractional sampling rate is 1.5, 1.33, and 1.25; however, the disclosed technique is not limited to these fractional sampling rates. The disclosed technique can be applied to every case where the output symbols are output at intervals different from the supply interval of the reception samples.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A signal processing circuit comprising:
   a processor configured to adjust phases of reception samples which is supplied at a supply interval, according to a phase adjustment amount; and
   a processing circuit including a finite impulse response (FIR) filter with a plurality of taps and configured to process, by the FIR filter, each of the reception samples whose phases is adjusted by the processor and output output symbols at an output interval different from the supply interval,
   the processor is further configured to:
   derive initial values of tap coefficients for the respective taps; and
   derive the phase adjustment amount such that a center of centroids of the tap coefficients at respective output time points of the output symbols coincides with a center of a number of taps of the FIR filter, the tap coefficients at respective output time points of the output symbols being set according to a deviation between the supply interval and the output interval and the initial values of the tap coefficients.

2. The signal processing circuit according to claim 1, wherein
   the processor is configured to derive the phase adjustment amount by performing computation indicated by following formula (A), $$C = D_C + G_0 - N_C \quad (A)$$

where a center of a deviation between a supply timing of the reception samples and an output timing of the output symbols is $D_C$, a centroid of the initial values of the tap coefficients is $G_0$, the center of the number of taps of the FIR filter is $N_C$, and the phase adjustment amount is C.

3. The signal processing circuit according to claim 1, wherein
   the processer is configured to derive the phase adjustment amount by performing computation indicated by following formula (B), $$C = G_C - N_C \quad (B)$$

Where a center of centroids of the tap coefficients of the FIR filter at respective output time points of the output symbols is $G_C$, a center of the number of taps of the FIR filter is $N_C$, and the phase adjustment amount is C.

4. The signal processing circuit according to claim 1, wherein
   the processing circuit includes:
   a first FIR filter including a plurality of taps and configured to accept an input of a reception sample corresponding to a first polarized wave of an optical signal and outputting a signal corresponding to the first polarized wave; and
   a second FIR filter including the same number of taps as the first FIR filter and configured to accept an input of a reception sample corresponding to a second polarized wave orthogonal to the first polarized wave of the optical signal and output a signal corresponding to the second polarized wave.

5. An optical receiving device comprising:
   a converting circuit configured to convert an optical signal into an electrical signal; and
   a signal processing circuit configured to process the electrical signal and including:
   a processor configured to adjust phases of reception samples, which is supplied at a supply interval, of the electrical signal according to a phase adjustment amount; and
   a processing circuit including a finite impulse response (FIR) filter with a plurality of taps and configured to process, by the FIR filter, each of the reception samples whose phases is adjusted by the processor and output output symbols at an output interval different from the supply interval,
   the processor is further configured to:
   derive initial values of tap coefficients for the respective taps; and
   derive the phase adjustment amount such that a center of centroids of the tap coefficients at respective output time points of the output symbols coincides with a center of a number of taps of the FIR filter, the tap coefficients at respective output time points of the output symbols being set according to a deviation between the supply interval and the output interval and the initial values of the tap coefficients.

6. The optical receiving device according to claim 5, wherein
   the processor is configured to derive the phase adjustment amount by performing computation indicated by following formula (A), $$C = D_C + G_0 - N_C \quad (A)$$

where a center of a deviation between a supply timing of the reception samples and an output timing of the output symbols is $D_C$, a centroid of the initial values of the tap coefficients is $G_0$, the center of the number of taps of the FIR filter is $N_C$, and the phase adjustment amount is C.

7. The optical receiving device according to claim 1, wherein
   the processer is configured to derive the phase adjustment amount by performing computation indicated by following formula (B), $$C = G_C - N_C \quad (B)$$

Where a center of centroids of the tap coefficients of the FIR filter at respective output time points of the output symbols is $G_C$, a center of the number of taps of the FIR filter is $N_C$, and the phase adjustment amount is C.

8. The optical receiving device according to claim 5, wherein
the processing circuit includes:
a first FIR filter including a plurality of taps and configured to accept an input of a reception sample corresponding to a first polarized wave of an optical signal and outputting a signal corresponding to the first polarized wave; and
a second FIR filter including the same number of taps as the first FIR filter and configured to accept an input of a reception sample corresponding to a second polarized wave orthogonal to the first polarized wave of the optical signal and output a signal corresponding to the second polarized wave.

* * * * *